(12) United States Patent
Yamada

(10) Patent No.: US 9,177,040 B2
(45) Date of Patent: Nov. 3, 2015

(54) INFORMATION PROCESSING DEVICE FOR VEHICLE AND DATABASE

(75) Inventor: Yuki Yamada, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 253 days.

(21) Appl. No.: 13/989,236

(22) PCT Filed: Dec. 1, 2010

(86) PCT No.: PCT/JP2010/071477
§ 371 (c)(1),
(2), (4) Date: May 23, 2013

(87) PCT Pub. No.: WO2012/073355
PCT Pub. Date: Jun. 7, 2012

(65) Prior Publication Data
US 2013/0246421 A1    Sep. 19, 2013

(51) Int. Cl.
*G06F 17/00* (2006.01)
*G06F 17/30* (2006.01)
*B60W 30/14* (2006.01)
*B60W 40/06* (2012.01)
*G08G 1/00* (2006.01)

(52) U.S. Cl.
CPC ....... *G06F 17/30595* (2013.01); *B60W 30/143* (2013.01); *B60W 40/06* (2013.01); *B60W 2550/14* (2013.01); *B60W 2550/22* (2013.01); *B60W 2720/106* (2013.01)

(58) Field of Classification Search
CPC ......... G08G 1/00; G08G 1/0969; G08G 1/16; G06F 7/00; B60R 21/00
USPC ......... 701/70, 32.3, 32.4, 32.5, 33.4, 300, 93, 701/96
See application file for complete search history.

(56) References Cited

U.S. PATENT DOCUMENTS

| | | | |
|---|---|---|---|
| 5,948,035 A * | 9/1999 | Tomita | 701/70 |
| 6,067,488 A * | 5/2000 | Tano | 701/33.4 |
| 2009/0069994 A1* | 3/2009 | Uechi et al. | 701/70 |
| 2009/0299594 A1* | 12/2009 | Harumoto et al. | 701/70 |
| 2012/0221170 A1* | 8/2012 | Tanoue et al. | 701/1 |

FOREIGN PATENT DOCUMENTS

| | | |
|---|---|---|
| JP | 2005 174282 | 6/2005 |
| JP | 2007 198853 | 8/2007 |
| JP | 2009 103570 | 5/2009 |
| WO | WO 2012/039026 A1 | 3/2012 |

OTHER PUBLICATIONS

International Search Report Issued Mar. 8, 2011 in PCT/JP10/71477 Filed Dec. 1, 2010.

* cited by examiner

*Primary Examiner* — Tan Q Nguyen
(74) *Attorney, Agent, or Firm* — Oblon, McClelland, Maier & Neustadt, L.L.P.

(57) ABSTRACT

An electronic control unit (ECU) and a database (DB) of a travel assist device specify and store a deceleration end point of a vehicle on the basis of information relating to an absolute position independent from a structure on the ground. Further, the ECU and the DB of the travel assist device stores a deceleration end area which is an area within a predetermined range from the deceleration end point.

4 Claims, 7 Drawing Sheets

INFORMATION PROCESSING DEVICE FOR VEHICLE AND DATABASE

The present invention relates to an information processing device for a vehicle and a database, in particular to an information processing device for a vehicle and a database which store a drive operation of a driver.

BACKGROUND ART

A proposal in which data obtained by learning the drive operation of a driver is applied to many applications has been made. For example, in Patent Literature 1, a map information creation apparatus is disclosed which includes driver operation change detection means for detecting a driver operation change of a driver who drives a vehicle, position information acquisition means for acquiring position information of the vehicle such as latitude and longitude when the driver operation change detection means detects the driver operation change, and map information creation means for associating and storing the driver operation change with the position information, when there is the driver operation change.

CITATION LIST

Patent Literature

[Patent Literature 1] Japanese Unexamined Patent Application Publication No. 2009-103570

SUMMARY OF INVENTION

Technical Problem

Incidentally, in the memory method in the related art, after a drive assist and the like for the driver is performed, it is not possible to ensure the accuracy, so there is a need for improvement in creating a database.

With consideration of the above facts, an object of the invention is to provide an information processing device for a vehicle and a database capable of being more easily applied to a drive assistance.

Solution to Problem

An aspect of the present invention is to provide an information processing device for a vehicle including a memory unit that specifies and stores a deceleration end point of a vehicle on the basis of absolute position information that is information relating to an absolute position independent from a structure on the ground, and stores an area within a predetermined range from the deceleration end point as a deceleration area.

According to the aspect, the memory unit specifies and stores the deceleration end point of the vehicle on the basis of the absolute position information that is information relating to the absolute position independent from the structure on the ground. Further, the memory unit stores the area within the predetermined range from the deceleration end point as the deceleration area. Therefore, a predetermined range from the deceleration end point Se which is a point where the operation of a driver changes, is treated as the deceleration end area Ae which is one operation area, and a database of the deceleration end area Ae is made, so that the application to the drive assistance becomes easier.

In this case, the memory unit may specify and store at least one of a deceleration start point of the vehicle and an exit point to the outside of the predetermine range from the deceleration end point of the vehicle on the basis of the absolute position information, and specify the deceleration area based on at least one of the deceleration end point, and the deceleration start point and the exit point.

According to the aspect, the memory unit may specify and store at least one of the deceleration start point of the vehicle and the exit point to the outside of the predetermine range from the deceleration end point of the vehicle on the basis of the absolute position information, and specify the deceleration area based on at least one of the deceleration end point, and the deceleration start point and the exit point. Therefore, even if the deceleration end points are the same, the deceleration area may be subdivided in more detail for each operation of the driver in which the deceleration start points are different and the exit points are different, and made into a database. In addition, in the present invention, it is not necessary that the boundary of the deceleration area and the exit point are coincident.

In this case, when at least one of following distances is equal to or more than the predetermined value: a distance between the present deceleration end point of the vehicle and the deceleration end point of the deceleration area of the vehicle that was stored in the past, a distance between the present deceleration start point of the vehicle and the deceleration start point of the deceleration area of the vehicle that was stored in the past, and a distance between the present exit point and the exit point of the deceleration area of the vehicle that was stored in the past, the memory unit may store an area within a predetermined range from the present deceleration end point of the vehicle as a new deceleration area.

According to the aspect, when at least one of following distances is equal to or more than the predetermined value: a distance between the present deceleration end point of the vehicle and the deceleration end point of the deceleration area of the vehicle that was stored in the past, a distance between the present deceleration start point of the vehicle and the deceleration start point of the deceleration area of the vehicle that was stored in the past, and a distance between the present exit point and the exit point of the deceleration area of the vehicle that was stored in the past, the memory unit may store an area within a predetermined range from the present deceleration end point of the vehicle as a new deceleration area. Therefore, even if the deceleration end points are the same, the deceleration area may be subdivided in more detail for each operation of the driver, in which the deceleration start points are different and the exit points are different, and made into a database.

In this case, when the distance between the present deceleration end point of the vehicle and the deceleration end point of the deceleration area of the vehicle that was stored in the past is less than the predetermined value, the distance between the present deceleration start point of the vehicle and the deceleration start point of the deceleration area of the vehicle that was stored in the past is less than the predetermined value, and the distance between the present exit point of the vehicle and the exit point of the deceleration area of the vehicle that was stored in the past is equal to or more than the predetermined value, at least one of when the difference between the vehicle speed in the present deceleration end point of the vehicle and the vehicle speed in the deceleration end point of the deceleration area of the vehicle that was stored in the past is less than the predetermined value, and when the vehicle speed in the present deceleration end point of the vehicle is in the vicinity of 0 km/h, and the memory unit may not store an area within the predetermined range from the present deceleration end point of the vehicle as a new deceleration area.

When the distance between the present deceleration end point of the vehicle and the deceleration end point of the deceleration area of the vehicle that was stored in the past is less than the predetermined value, the distance between the present deceleration start point of the vehicle and the deceleration start point of the deceleration area of the vehicle that was stored in the past is less than the predetermined value, and the distance between the present exit point of the vehicle and the exit point of the deceleration area of the vehicle that was stored in the past is equal to or more than the predetermined value, even in a case where only the present exit point and the past exit point are different from each other, if the difference between the vehicle speeds in the present deceleration end point and the past deceleration end point is not found, or if the vehicle speed in the present deceleration end point is in the vicinity of 0 km/h, it is considered that the exit points are different but it is regarded as the same deceleration behavior, and thus the driver does not feel a sense of incompatibility. Therefore, according to the above aspect, it is possible to prevent the driver operations from being divided more specifically without making the driver feel uncomfortable.

Otherwise, the memory unit includes the deceleration start point of the deceleration area that was stored in the past, and sets as a reference line, one side that is farthest away from the deceleration area in a square-shaped area having two sides parallel to an average orientation of the vehicle in each of the deceleration start points of the deceleration area that was stored in the past.

According to the aspect, the memory unit may include the deceleration start point of the deceleration area that was stored in the past, and set as a reference line, one side that is farthest away from the deceleration area in a square-shaped area having two sides parallel to an average orientation of the vehicle in each of the deceleration start points of the deceleration area that was stored in the past. Therefore, by a simple method, the reference line that is a reference of a start of the deceleration operation by the driver may be set, and may be easily applied by the drive assist.

In addition, the absolute position information may include the information relating to latitude and longitude.

According to the above aspect, the absolute position information includes the information relating to the latitude and the longitude. Therefore, the memory unit may specify and store the deceleration end point by obtaining the latitude and the longitude by GPS and the like without map information such as link IDs or nodes relating to the structure on the ground.

In addition, the present invention is a database which specifies and stores a deceleration end point of a vehicle on the basis of absolute position information that is information relating to an absolute position independent from a structure on the ground, and stores an area within a predetermined range from the deceleration end point as a deceleration area.

Advantageous Effects of Invention

According to the information processing device for vehicle and the database of the present invention, it is possible to be more easily applied to the drive assist without using map information.

DESCRIPTION OF EMBODIMENTS

Figure 1:
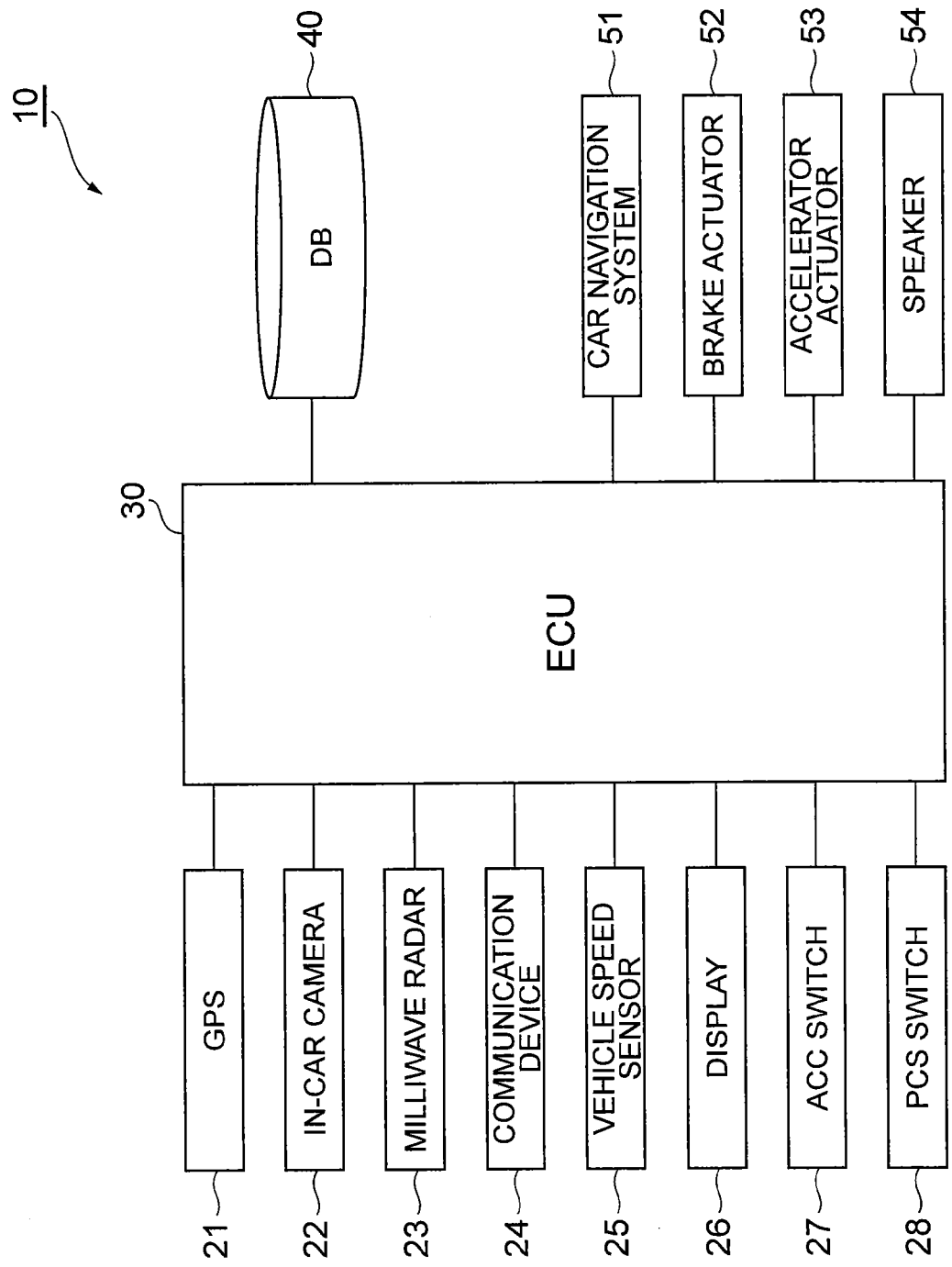
FIG. 1 is a block diagram illustrating a configuration of a drive assisting device according to a first embodiment.

Hereinafter, a description of an information processing device for a vehicle according to embodiments of the present invention will be made referring to drawings. As shown in FIG. 1, the information processing device for a vehicle of a first embodiment of the present invention is configured by a drive assisting device 10 that is installed in the vehicle. The drive assisting device 10 according to the embodiment is a device which performs drive assistance such as inducing a deceleration operation of the driver such that the driver applies an engine brake at a proper timing, for example, for a mileage improvement. The drive assisting device 10 of the embodiment includes a GPS 21, an in-car camera 22, a milliwave radar 23, a communication device 24, a vehicle speed sensor 25, a display 26, an ACC switch 27, a PCS switch 28, an ECU 30, a DB 40, a car navigation system 51, a brake actuator 52, an accelerator actuator 53 and a speaker 54.

The GPS 21 performs positioning of a host vehicle by receiving a signal from a GPS satellite. The in-car camera 22 is a camera to take an image of the vicinity of the host vehicle in order to detect a status in the vicinity of the host vehicle. The milliwave radar 23 detects the status in the vicinity of the host vehicle by detecting a reflecting wave of the milliwave radiated in the vicinity of the host vehicle. The communication device 24 communicates with facilities such as other vehicles or an information processing center. The vehicle speed sensor 25 is a sensor to detect a vehicle speed of the host vehicle by detecting an rpm (revolutions per minute) of the wheels of the host vehicle.

The display 26 displays information relating to the deceleration operation and the like such that the driver of the host vehicle applies the engine brake at a proper timing. The ACC (Adaptive Cruise Control) switch 27 is a switch to operate an ACC system that controls the vehicle speed and the inter-vehicle distance by controlling an accelerator amount and a brake amount by monitoring the distance between a forward vehicle and the host vehicle using the milliwave radar 23. The PCS (Pre-Crash Safety) switch 28 is a switch to operate a PCS system which prevents a crash with an obstacle in the vicinity of the host vehicle in order to reduce damage caused by a crash.

The ECU (Electronic Control Unit) 30 performs the entire control of the drive assisting device 10 as described later. For example, the ECU 30 is mainly configured by a CPU, and includes a ROM, a RAM, an input signal circuit, an output signal circuit, a power circuit, and the like.

The DB (Data Base) 40 associates and stores information of the position of the vehicle at the start of the deceleration operation such as an accelerator-OFF operation by the driver of the host vehicle, the position of the vehicle at the end of the deceleration operation and a node number that are learned by the drive assisting device 10.

The car navigation system 51 gives a path guide to the driver of the host vehicle using the positioning information of the GPS 21.

The brake actuator 52 and the accelerator actuator 53, based on a command signal from the ECU 30, induces the drive operation of the driver by giving a reaction force to the brake pedal or the accelerator pedal such that the driver of the host vehicle applies the engine brake and the like at a proper timing. Further, the brake actuator 52 and the accelerator actuator 53 adjust the brake amount or the accelerator amount such that the driver applies the engine brake and the like at a proper timing and the host vehicle travels. Further, the brake actuator 52 and the accelerator actuator 53 detect the amount that the driver pressed the brake and the amount that the driver pressed the accelerator using the sensor and send the detected amounts to the ECU 30.

The speaker 54 notifies the driver of the host vehicle of information relating to the deceleration operation using a sound such that the driver applies the engine brake at a proper timing.

Hereinafter, the operation of the drive assisting device 10 of the embodiment will be described. The drive assisting device 10 of the embodiment learns the travel data of the usual drive operation of the driver and very accurately associates and stores the travel data with the position in a system that performs the drive assistance As described below, in the present embodiment, the travel distance from the point as a reference is calculated in order to associate the travel data with the position. In the embodiment, as information relating to the point as the reference, a predetermined range of area that is specified by latitude and longitude by GPS 21 is used.

Hereinafter, a description of an operation to learn a deceleration behavior will be made. In a case of learning the position of the deceleration behavior, following procedures are performed:

(Procedure 1): the position of an operation relating to the deceleration behavior suitable for learning, namely, the deceleration performed in the same place to some extent is extracted. In Procedure 1, focusing on the deceleration end position which tends to be stable in the deceleration behavior, if the range of the latitude and the longitude thereof are equal to or less than a constant value, it is regarded as the same deceleration behavior.

(Procedure 2): by learning the deceleration behavior in the Procedure 1, a reference to be used when performing the drive assist is specified. That is, the deceleration behavior of the same deceleration end reference is extracted, and the reference of the deceleration start is calculated from the deceleration start position.

(Procedure 3): The distance and the travel data from the reference determined in Procedure 2 are associated and learned. That is, the travel distance after passing through the position of the latitude and the longitude as the start reference is calculated, and the operation position of the accelerator-OFF operation and the like of each driver is learned.

Figure 2:
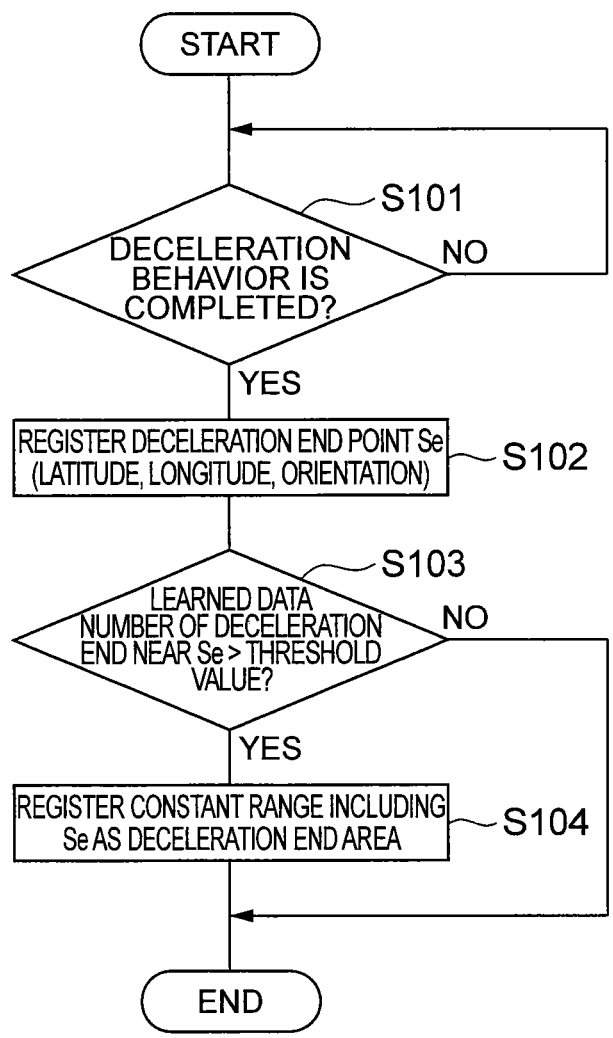
FIG. 2 is a flow chart illustrating an operation of storing a deceleration end area of the drive assisting device according to the first embodiment.

First, (Procedure 1) will be described. As shown in FIG. 2, the ECU 30 of the drive assisting device 10 determines whether the deceleration behavior is completed in which the vehicle speed is lowered, the driver presses the brake pedal, releases the accelerator pedal or lowers the shift position of the transmission, using the vehicle speed sensor 25, the brake actuator 52, the accelerator actuator 53, a shift position sensor that is installed in a transmission, or the like (S101).

When the deceleration behavior is completed (S101), the ECU 30 registers the latitude and the longitude of the deceleration end point Se and the orientation that is the progressing angle of the vehicle in the deceleration end point Se with the DB 40 (S102). The ECU 30 determines referring to the DB 40 whether among the learned travel data, the registered number of the deceleration end point near the deceleration end point Se is equal to or more than the constant value (S103).

When the registered number of the deceleration end point near the deceleration end point Se is equal to or more than the constant value (S104), the ECU 30 includes the deceleration end point Se and registers a constant range within the distance of a predetermined value d from the deceleration end point Se as a deceleration end area Ae with the DB 40 (S105). In addition, ECU 30 may change the constant range within the distance of the predetermined value d from the deceleration end point Se considering stability of the deceleration behavior of the vehicle. For example, in a case where a deceleration position or a vehicle speed is more stable than any other places, such as an intersection where a vehicle temporarily stops, the range from the deceleration end point Se that is registered as a deceleration end area Ae may be smaller than any other places.

Figure 3:
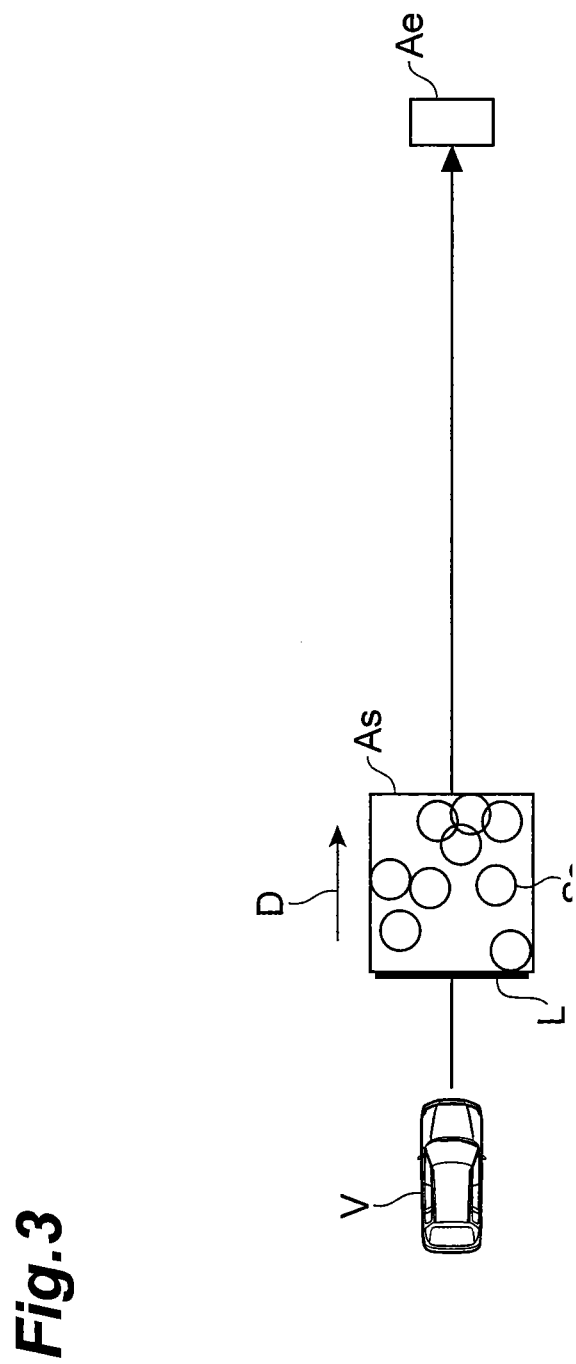
FIG. 3 is a plan view illustrating a vehicle, the deceleration end area, a deceleration start point and a reference line when the reference line of the drive assisting device according to the first embodiment is set.
Figure 4:
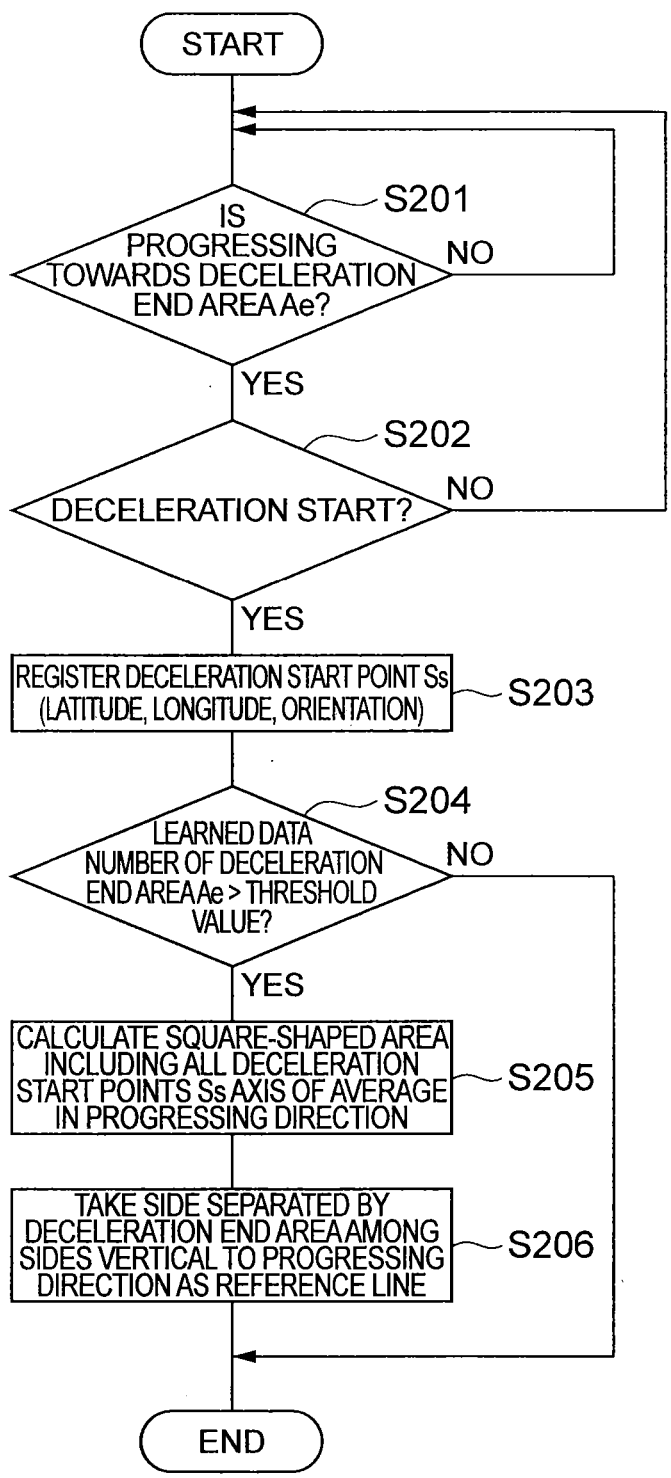
FIG. 4 is a flow chart illustrating an operation of setting the reference line of the drive assisting device according to the first embodiment is set.

Next, (Procedure 2) will be described. As shown in FIG. 3, the vehicle V is regarded as progressing towards the registered deceleration end area Ae. As shown in FIG. 4, the ECU 30 of the drive assisting device 10 determines whether the vehicle V is progressing towards the deceleration end area Ae (S201). When it is determined that the vehicle V is progressing towards the deceleration end area Ae (S201), the ECU 30 determines whether the deceleration behavior is started in which the vehicle speed is lowered, the driver presses the brake pedal, releases the accelerator pedal or lowers the shift position of the transmission, using the vehicle speed sensor 25, the brake actuator 52, the accelerator actuator 53, a shift position sensor installed in the transmission, or the like (S202).

When the deceleration behavior is started (S202), the ECU 30 registers the latitude, the longitude of the deceleration start point Ss and the orientation that is the progressing angle of the vehicle in the deceleration start point Ss with the DB 40 (S203). The ECU 30 determines whether, referring to the DB 40, among the learned travel data of the deceleration behavior, the number of data included in the deceleration end area Ae of which the deceleration end point Se is registered is equal to or more than the constant number (S204).

As shown in FIGS. 3 and 4, the ECU 30 calculates an average orientation D of the vehicle V in the deceleration start point Ss with respect to data included in the deceleration end area Ae of which the deceleration end point Se is registered, and calculates a deceleration start area As which is a square-shaped area including all deceleration start points Ss and has two sides parallel to the orientation D (S205). ECU 30 registers the side separated by the deceleration end area Ae among the two sides vertical to the orientation D of the deceleration start area As as the reference line L with the DB 40 (S206).

Next, (Procedure 3) will be described. The ECU 30 of the drive assisting device 10 associates the deceleration start point Ss and the deceleration end point Se with each travel distance from the point where the vehicle V passes through the reference line L that is calculated in Procedure 2 to each point where the vehicle V respectively reaches the deceleration start point Ss and the deceleration end point Se, and stores the associated data in the DB 40. However, the ECU 30 regards the travel data in which the deceleration end position Se is not included in the deceleration end area Ae as invalid, and the travel data is not included in the above process.

Accordingly, when the travel assist device 10 determines that the vehicle V passes through the reference line, and reaches the deceleration start point Ss and the deceleration end point Se using the GPS 21 next time, the travel assist device 10 may perform a drive assistance, such as urging the driver to do a drive operation of each of the deceleration start, the deceleration end, and the like through a driving interruption using a sound by the speaker 54 or a reaction power by the brake actuator 52 and the accelerator actuator 53.

According to the embodiment, the ECU 30 and the DB 40 of the travel assist device 10 specifies and stores the deceleration end point Se of the vehicle V as information relating to an absolute position independent from the structure on the ground. Therefore, in the vehicle in which a navigation system is not installed, the deceleration end point Se may be specified and stored even if there is no map information such as a link ID or node in the map information database. In addition, the ECU 30 and the DB 40 of the travel assist device 10 stores the area within the predetermined range from the deceleration end point Se as the deceleration end area Ae. Therefore, a database is made in which the predetermined range centered from the deceleration end point Se that is the point where the driver's operation changes as the deceleration end area Ae that is one operation area, thereby being more easily applied to the drive assistance.

In addition, according to the embodiment, the ECU 30 and the DB 40 of the travel assist device 10 include all of the deceleration start points As of the deceleration end area Se that was stored in the past, set one side that is farthest away from the deceleration end area Ae in a square-shaped area having two sides parallel to an average orientation D of the vehicle V in each of the deceleration start point Ss of the deceleration end area Ae that was stored in the past, as a reference line L. Therefore, by a simple method, the reference line L that is a reference of a start of the deceleration operation of the driver may be set, and may be more easily applied to the drive assist.

In addition, according to the embodiment, the information relating to the absolute position independent from the structure on the ground includes information relating to latitude and longitude. Accordingly, the ECU 30 and the DB 40 of the travel assist device 10 may specify and store the deceleration end point Se by obtaining the latitude and the longitude of the point using the GPS, even if there is not map information such as a link ID or node relating to the structure on the ground.

In the embodiment, since the position is determined using only the latitude, the longitude and the orientation of the GPS 21, it is possible to realize a system in a simple configuration, and the embodiment may be realized even in a vehicle in which a navigation system is not installed. However, in a case without map data, a case is considered where it is difficult to determine whether the targets of the deceleration behavior are the same. That is, it is necessary to determine whether it is a deceleration in the temporary stop intersection or a deceleration for the forward vehicle. For this reason, in the embodiment, the deceleration behavior is determined based on the latitude, the longitude and the vehicle speed of the most stable deceleration end position.

Hereinafter, a description of a second embodiment of the present invention will be made. In the embodiment, in the (Procedure 1) in order to further improve an accuracy in classifying the kind of the deceleration behavior, not only the latitude and the longitude of the deceleration end point Se, but also the latitude and the longitude of the deceleration start point Ss and the exit point to the outside of the predetermined range from the deceleration end point Se are determined.

Figure 5:
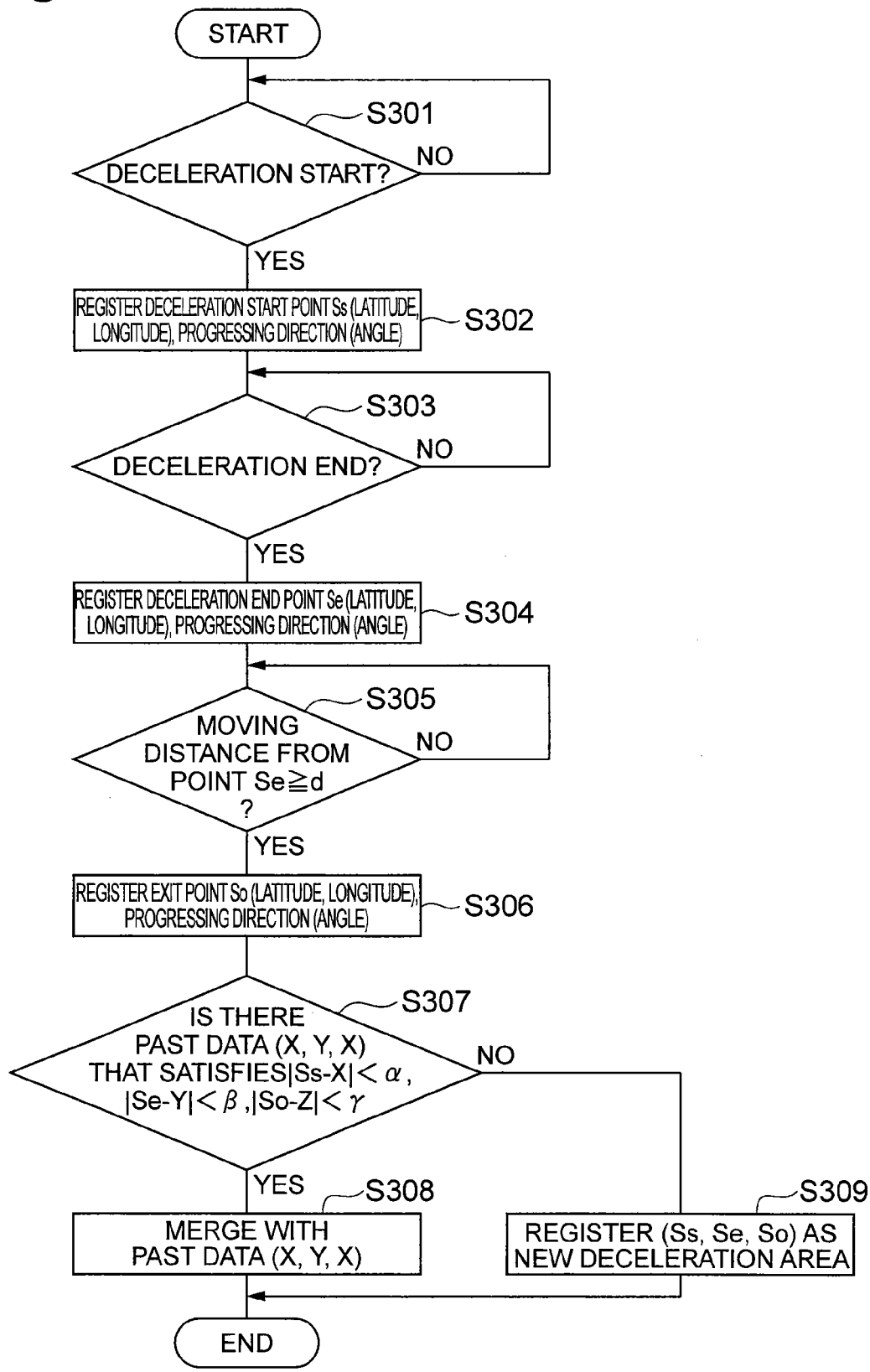
FIG. 5 is a flow chart illustrating an operation of storing a deceleration place of a drive assisting device according to a second embodiment.
Figure 6:
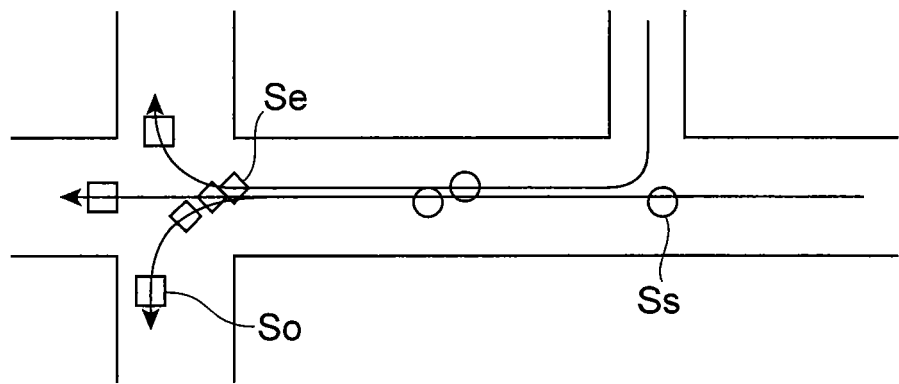
FIG. 6 is a plan view illustrating a deceleration start point, a deceleration end point and an exit point when the deceleration place of the drive assisting device according to the second embodiment is stored.

As shown in FIGS. 5 and 6, the ECU 30 of the drive assisting device 10 determines whether the deceleration behavior is started in which the vehicle speed is lowered, the driver presses the brake pedal, releases the accelerator pedal or lowers the shift position of the transmission, using the vehicle speed sensor 25, the brake actuator 52, the accelerator actuator 53, a shift position sensor installed in a transmission, or the like (S301). When the deceleration behavior is started (S301), the ECU 30 registers the latitude and the longitude of the deceleration start point Ss and the orientation that is the progressing angle of the vehicle in the deceleration start point Ss with the DB 40 (S302).

The ECU 30 determines whether the deceleration behavior is completed in which the vehicle speed is raised, the driver presses the brake pedal, releases the accelerator pedal or lowers the shift position of the transmission, using the vehicle speed sensor 25, the brake actuator 52, the accelerator actuator 53, a shift position sensor installed in a transmission, or the like (S303). When the deceleration behavior is completed (S303), the ECU 30 registers the latitude, the longitude of the deceleration end point Se and the orientation that is the progressing angle of the vehicle in the deceleration end point Se with the DB 40 (S304).

The ECU 30 determines whether the moving distance of the vehicle from the deceleration end point Se is equal to or more than a constant value d (S305). When the moving distance of the vehicle from the deceleration end point Se is equal to or more than a constant value d (S305), the ECU 30 registers the latitude, the longitude of the exit point So that is a point in which the moving distance of the vehicle from the deceleration end point Se is the predetermined value d and the orientation that is the progressing angle of the vehicle in the exit point So with the DB 40 (S306).

ECU 30 determines, referring to the DB 40, whether among the travel data that is learned in the past, there is the past travel data (X, Y, Z) in which the distance between the present deceleration start point Ss and the past deceleration start point X is less than the predetermined threshold value α, the distance between the present deceleration end point Se and the past deceleration end point Y is less than the predetermined threshold value β, and the distance between the present exit point So and the past exit point Z is less than the predetermined threshold value γ (S307). In this case, the, ECU 30 may determine whether the respective difference between each orientation of the present deceleration start point Ss, the present deceleration end point Se and the present exit point So and each orientation of the past deceleration start point X, the past deceleration end point Y and the past exit point Z is less than the predetermined threshold value δ.

When, among the travel data that is learned in the past, there is the past travel data (X, Y, Z) in which the distance between the present deceleration start point Ss and the past deceleration start point X is less than the predetermined threshold value α, the distance between the present deceleration end point Se and the past deceleration end point Y is less than the predetermined threshold value β, and the distance between the present exit point So and the past exit point Z is less than the predetermined threshold value γ (S307), ECU 30 registers by merging the present deceleration start point Ss, the present deceleration end point Se and the present exit point So with the past travel data (X, Y, Z) (S308). When, among the travel data that is learned in the past, there is no past travel data (X, Y, Z) in which the distance between the present deceleration start point Ss and the past deceleration start point X is less than the predetermined threshold value α, the distance between the present deceleration end point Se and the past deceleration end point Y is less than the predetermined threshold value β, and the distance between the present exit point So and the past exit point Z is less than the predetermined threshold value γ (S307), the ECU 30 registers a constant range within the predetermined distance from the present deceleration start point Ss, the present deceleration end point Se and the present exit point So as the deceleration end area Ae with the DB 40 (S309).

In addition, in S307, as the threshold values α, β, γ or δ, the calculated value by an experiment and the like may be used. Otherwise, in S307, as the threshold values α, β, γ or δ, the same value may be used. In S307, the threshold values α, β, γ or δ may change on the basis of the tendency of the driver. For example, in a case of the driver having a poor driving skill, the threshold values α, β, γ or δ may be set to a large value. In addition, in S301 to S309, the steering start points of the vehicle in the present and the past may also be considered for determination other than the present deceleration start point Ss, the past deceleration start point X, the present deceleration end point Se, the past deceleration end point Y, the present exit point So, and the past exit point Z.

In addition, with respect to the present deceleration start point Ss, the past deceleration start point X, the present deceleration end point Se, the past deceleration end point Y, the present exit point So, and the past exit point Z, even if the difference between the present exit point So and the past exit point Z is equal to or more the threshold value γ, in a case where the position difference and vehicle speed difference in the deceleration end points Se are almost not found, or in a case where the vehicle speed in the deceleration end point Se is as low as or close to 0 km/h (for example, 0 to 5 km/h), the ECU 30 cannot consider that the exit point So and Z are different. That is because the same deceleration behavior does not make the diver feel a sense of incompatibility in those cases.

According to the embodiment, the ECU 30 and the DB 40 of the travel assist device 10 specify and store at least one of the deceleration start point Ss of the vehicle and exit points to the outside of a predetermine range from the deceleration end point Se of the vehicle on the basis of the absolute position information, and specify the deceleration area Ae based on at least one of a deceleration end point Se, and the deceleration start point Ss and the exit points So. Therefore, even if the deceleration end points Se are the same, the deceleration area Ae may be subdivided in more detail for each operation of the driver in which the deceleration start points Ss are different and the exit points So are different, and made into a database.

Further, according to the embodiment, the ECU 30 and the DB 40 of the travel assist device 10 store an area within a predetermined range from the present deceleration end point Se of the vehicle as a new deceleration area Ae, when at least one of the distance between the present deceleration start point Ss of the vehicle and the deceleration start point X of the deceleration area of the vehicle that was stored in the past, the distance between the present deceleration end point Se of the vehicle and the deceleration end point Y of the deceleration area of the vehicle that was stored in the past, and the distance between the present exit point So and the exit point Z of the deceleration area of the vehicle that was stored in the past is equal to or more than a predetermined value. Therefore, even if the deceleration end points Se are the same, the deceleration area may be subdivided in more detail for each operation of the driver in which the deceleration start points Ss are different and the exit points So are different, and made into a database.

When the distance between the present deceleration end point Se of the vehicle and the deceleration end point Y of the deceleration area of the vehicle that was stored in the past is less than the predetermined value, the distance between the present deceleration start point Ss of the vehicle and the deceleration start point X of the deceleration area of the vehicle that was stored in the past is less than the predetermined value, and the distance between the present exit point So of the vehicle and the exit point Z of the deceleration area of the vehicle that was stored in the past is equal to or more than a predetermined value, even if only the present exit point So and the past exit point Z are different, if a difference in the vehicle speeds is not found in the present exit point Se and the past exit point Y, or the vehicle speed in the present deceleration end point Se is close to 0 km/h, it is considered that the exit points So, Z are different but it is regarded as the same deceleration behavior, and thus the driver does not feel a sense of incompatibility. Therefore, in the present embodiment, in the above case, an area within a predetermined range from the present deceleration end point Se of the vehicle is not stored as a new deceleration area Ae. Accordingly, it is possible to prevent the operations of the driver in which the exit points are different from being subdivided in more detail without making the driver feel incompatible.

Figure 7:
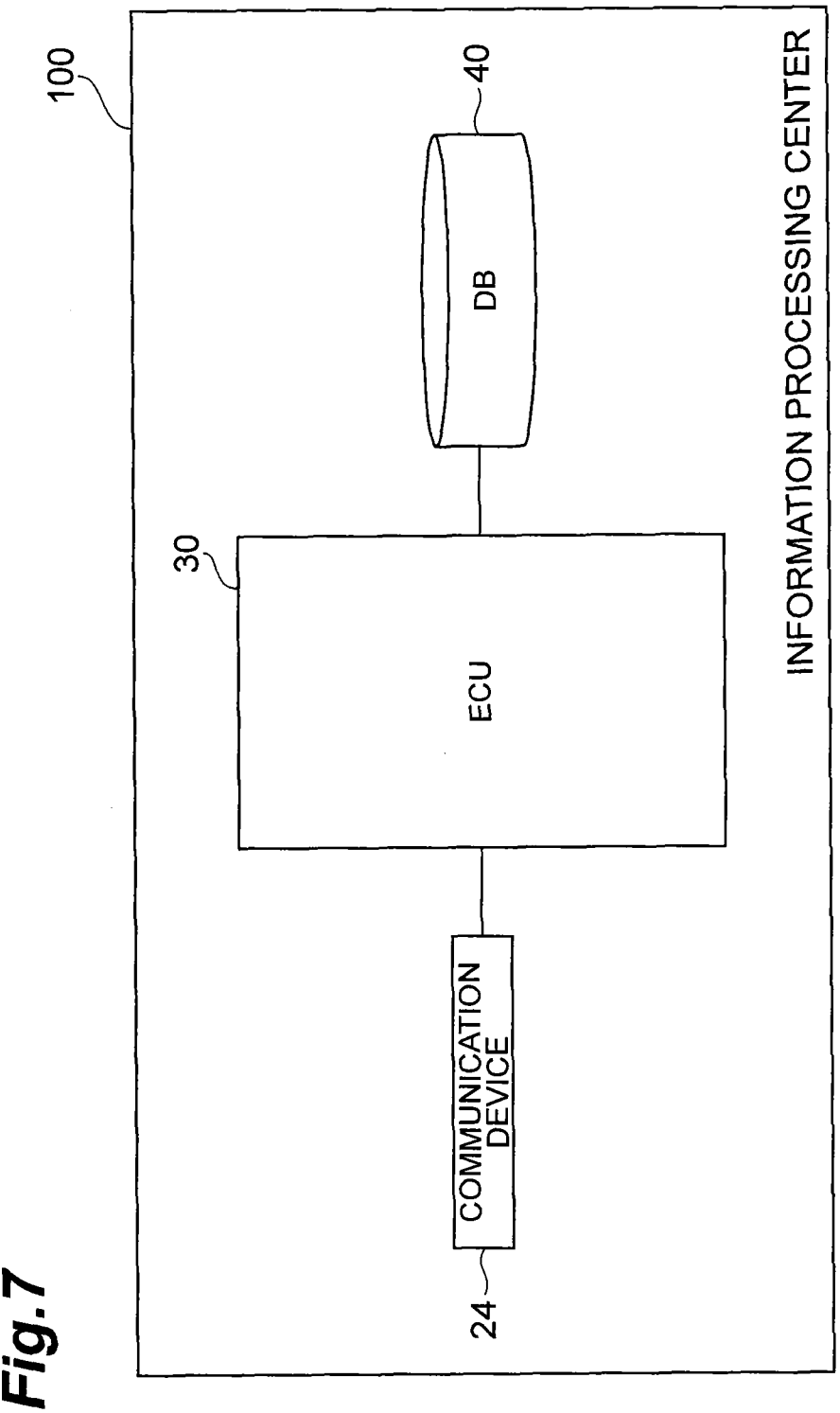
FIG. 7 is a block diagram illustrating a configuration of an information processing center according to a third embodiment.

Hereinafter, the description of the third embodiment of the present invention will be made. As shown in FIG. 7, in the embodiment, an information processing device for a vehicle of the present invention is configured by an information processing center 100. In the information processing center 100, the necessary data is received from a plurality of vehicles by the communication device 24, the ECU 30 performs the same information processing as that of the drive assisting device 10 that is installed in the vehicle of the first embodiment and the second embodiment, and stores the result of the information processing in the DB 40. In addition, the communication device 24 sends the information that is stored in the DB 40 to the plurality of vehicles.

According to the embodiment, the ECU 30 and the DB 40 of the information processing center 100 specify and store a deceleration end point Se of a vehicle on the basis of absolute position information that is information relating to an absolute position independent from a structure on the ground, and store an area within a predetermined range from the deceleration end point Se as a deceleration area Ae. Therefore, the information processing center and the like use the database, and thus the deceleration end point Se may be specified and stored without map information such as a link ID, node, etc., in a map information database. Further, a predetermined range from the deceleration end point Se which is a point where the operation of a driver changes, is treated as the deceleration end area Ae which is one operation area, and a database of the deceleration end area Ae is made, so that the application to the drive assist becomes easier in the vehicle.

Although heretofore descriptions of the embodiment of the present invention have been made, the present invention is not limited to the above embodiments, but rather various modifications can be made.

INDUSTRIAL APPLICABILITY

An information processing device for a vehicle and a database of the present invention may be applied to a drive assist without using map information.

REFERENCE SIGNS LIST

10 DRIVE ASSISTING DEVICE
21 GPS
22 IN-CAR CAMERA
23 MILIWAVE RADAR
24 COMMUNICATION DEVICE
25 VEHICLE SPEED SENSOR
26 DISPLAY
27 ACC SWITCH
28 PCS SWITCH
30 ECU
40 DB
51 CAR-NAVIGATION SYSTEM
52 BRAKE ACTUATOR
53 ACCELERATOR ACTUATOR
54 SPEAKER
100 INFORMATION PROCESSING CENTER

The invention claimed is:

1. An information processing device for a vehicle comprising:
   a memory unit that specifies and stores a deceleration end point of a vehicle, a deceleration start point of the vehicle, and an exit point to the outside of a predetermined range from the deceleration end point of the vehicle on the basis of absolute position information that is information relating to an absolute position independent from a structure on the ground, and stores an area within a predetermined range from the deceleration end point as a deceleration end area,
   wherein the memory unit specifies the deceleration end area based on the deceleration end point, and the deceleration start point and the exit point,
   wherein when at least one of following distances is equal to or more than the predetermined value: a distance between the present deceleration end point of the vehicle and the deceleration end point of the deceleration end area of the vehicle that was stored in the past, a distance between the present deceleration start point of the vehicle and the deceleration start point of the deceleration end area of the vehicle that was stored in the past, and a distance between the present exit point and the exit point of the deceleration end area of the vehicle that was stored in the past,
   the memory unit stores an area within a predetermined range from the present deceleration end point of the vehicle as a new deceleration end area, and
   wherein when the distance between the present deceleration end point of the vehicle and the deceleration end point of the deceleration end area of the vehicle that was stored in the past is less than the predetermined value, the distance between the present deceleration start point of the vehicle and the deceleration start point when the vehicle is toward the deceleration end area that was stored in the past is less than the predetermined value, and the distance between the present exit point of the vehicle and the exit point of the deceleration end area of the vehicle that was stored in the past is equal to or more than the predetermined value,
   at least one of when the difference between the vehicle speed in the present deceleration end point of the vehicle and the vehicle speed in the deceleration end point of the deceleration end area of the vehicle that was stored in the past is less than the predetermined value, and when the vehicle speed in the present deceleration end point of the vehicle is in the vicinity of 0 km/h, and
   the memory unit does not store the area within the predetermined range from the present deceleration end point of the vehicle as a new deceleration end area.

2. An information processing device for a vehicle comprising:
   a memory unit that specifies and stores a deceleration end point of a vehicle on the basis of absolute position information that is information relating to an absolute position independent from a structure on the ground, and stores an area within a predetermined range from the deceleration end point as a deceleration end area,
   wherein the memory unit includes the deceleration start point when the vehicle is toward the deceleration end area that was stored in the past, and sets as a reference line, one side that is farthest away from the deceleration end area in a square-shaped area having two sides parallel to an average orientation of the vehicle in each deceleration start point when the vehicle is toward the deceleration end area that was stored in the past.

3. The information processing device for a vehicle according to claim 1,
   wherein the absolute position information includes information relating to latitude and longitude.

4. The information processing device for a vehicle according to claim 2,
   wherein the absolute position information includes information relating to latitude and longitude.

* * * * *